(12) United States Patent
Wang et al.

(10) Patent No.: US 8,654,661 B2
(45) Date of Patent: Feb. 18, 2014

(54) METHOD AND APPARATUS FOR MULTICAST AND BROADCAST RETRANSMISSION IN WIRELESS COMMUNICATION SYSTEMS

(75) Inventors: Chun-Yen Wang, Tainan (TW); Chun-Yuan Chiu, Pingtung (TW)

(73) Assignee: Industrial Technology Research Institute, Chutung, Hsinchu (TW)

( * ) Notice: Subject to any disclaimer, the term of this patent is extended or adjusted under 35 U.S.C. 154(b) by 381 days.

(21) Appl. No.: 12/770,509

(22) Filed: Apr. 29, 2010

(65) Prior Publication Data

US 2010/0278093 A1 Nov. 4, 2010

Related U.S. Application Data

(60) Provisional application No. 61/175,147, filed on May 4, 2009.

(51) Int. Cl.
*G01R 31/08* (2006.01)
*H04B 1/44* (2006.01)

(52) U.S. Cl.
USPC .......................................... 370/252; 370/282

(58) Field of Classification Search
None
See application file for complete search history.

(56) References Cited

U.S. PATENT DOCUMENTS

| 6,895,216 | B2 | 5/2005 | Sato et al. | |
|---|---|---|---|---|
| 2005/0076283 | A1* | 4/2005 | Malkamaki et al. | 714/748 |
| 2008/0049692 | A1* | 2/2008 | Bachu et al. | 370/338 |
| 2009/0177937 | A1* | 7/2009 | Lee et al. | 714/748 |
| 2009/0185540 | A1* | 7/2009 | Pelletier et al. | 370/336 |
| 2009/0238128 | A1* | 9/2009 | Park et al. | 714/748 |
| 2009/0285141 | A1* | 11/2009 | Cai et al. | 370/311 |
| 2010/0050036 | A1* | 2/2010 | Chun et al. | 714/748 |
| 2010/0080152 | A1* | 4/2010 | Lindh et al. | 370/280 |
| 2010/0111226 | A1* | 5/2010 | Ko et al. | 375/299 |
| 2010/0115360 | A1* | 5/2010 | Seok et al. | 714/748 |
| 2010/0189039 | A1* | 7/2010 | Wang et al. | 370/328 |
| 2010/0202371 | A1* | 8/2010 | Josiam et al. | 370/329 |
| 2010/0271999 | A1* | 10/2010 | Yu et al. | 370/312 |
| 2011/0141952 | A1* | 6/2011 | Wang et al. | 370/294 |

OTHER PUBLICATIONS

Shokrollahi, A., "Raptor Codes," IEEE Transactions on Information Theory, vol. 52, No. 6, Jun. 2006 (pp. 2551-2567).

* cited by examiner

*Primary Examiner* — Eunsook Choi
(74) *Attorney, Agent, or Firm* — Finnegan, Henderson, Farabow, Garrett & Dunner, LLP

(57) ABSTRACT

Embodiments of method and apparatus for reception of multicast and broadcast (MBS) transmissions in a wireless communication system including a set of receiving devices is disclosed. A method embodiment includes encoding, by a transmission device, a plurality of MBS data bits to generate a plurality of MBS data versions, and transmitting, to the set of receiving devices, the plurality of MBS data versions, wherein the plurality of MBS data versions are transmitted in a predefined transmission pattern. The method also includes transmitting, to the set of receiving devices, identification and decoding information associated with each of the plurality of MBS data versions.

20 Claims, 10 Drawing Sheets

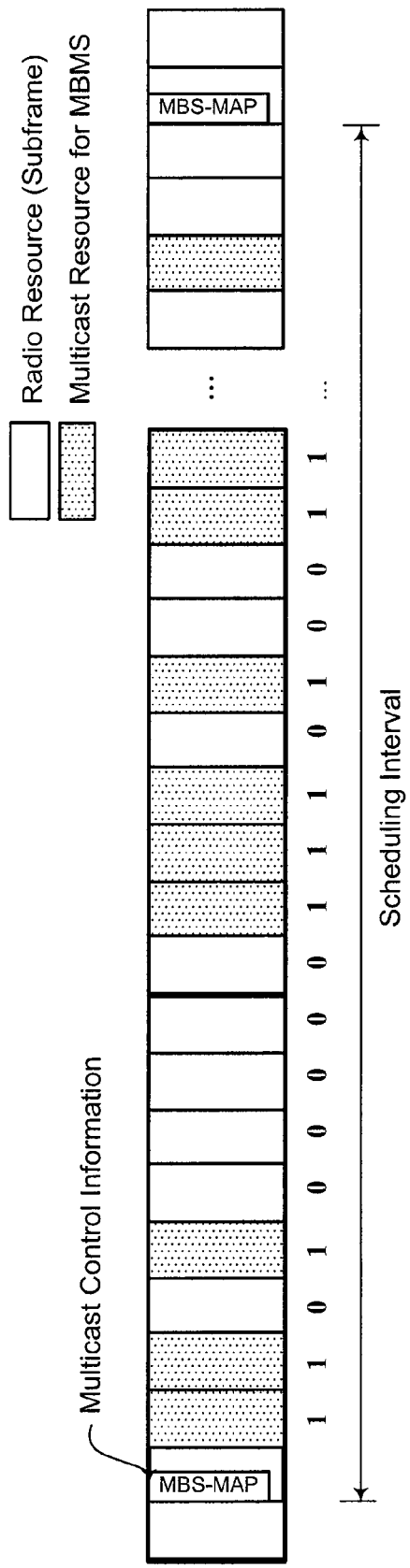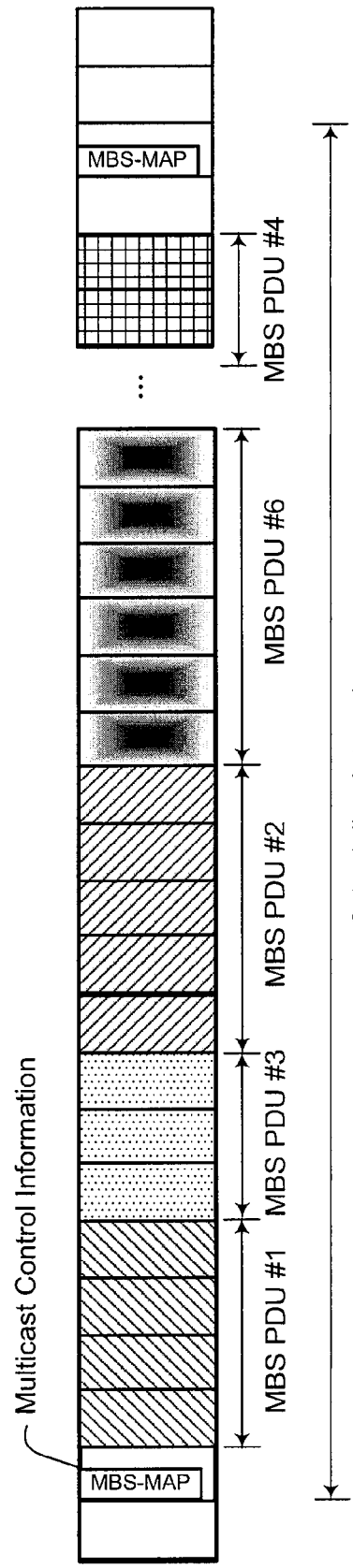
FIG. 4a
FIG. 4b

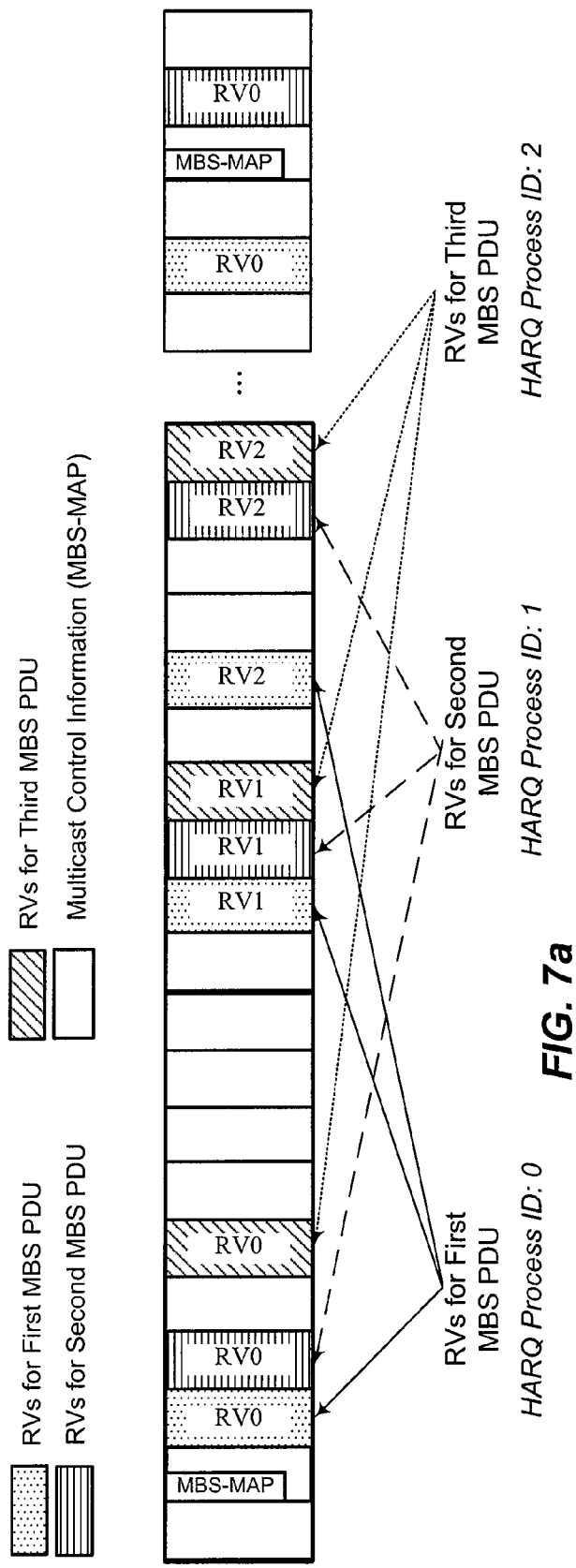
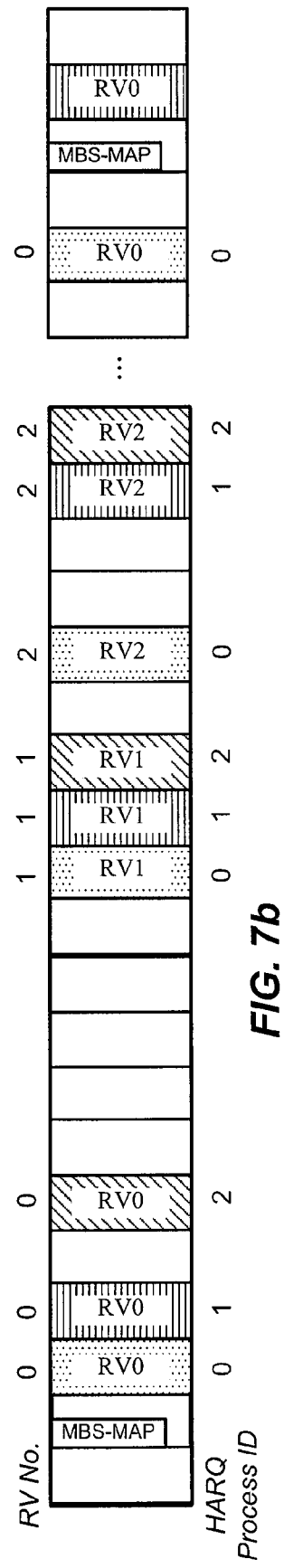
FIG. 7a
FIG. 7b

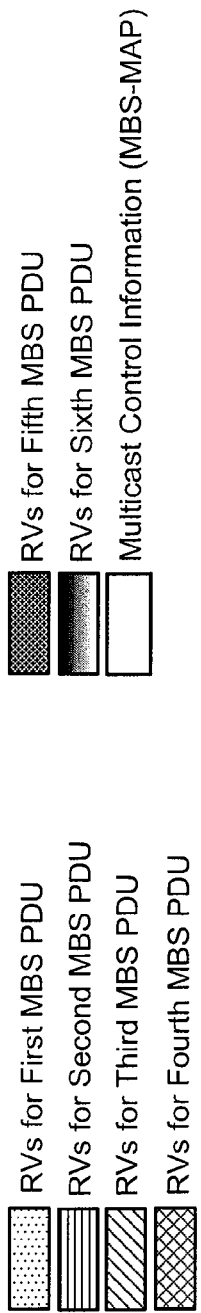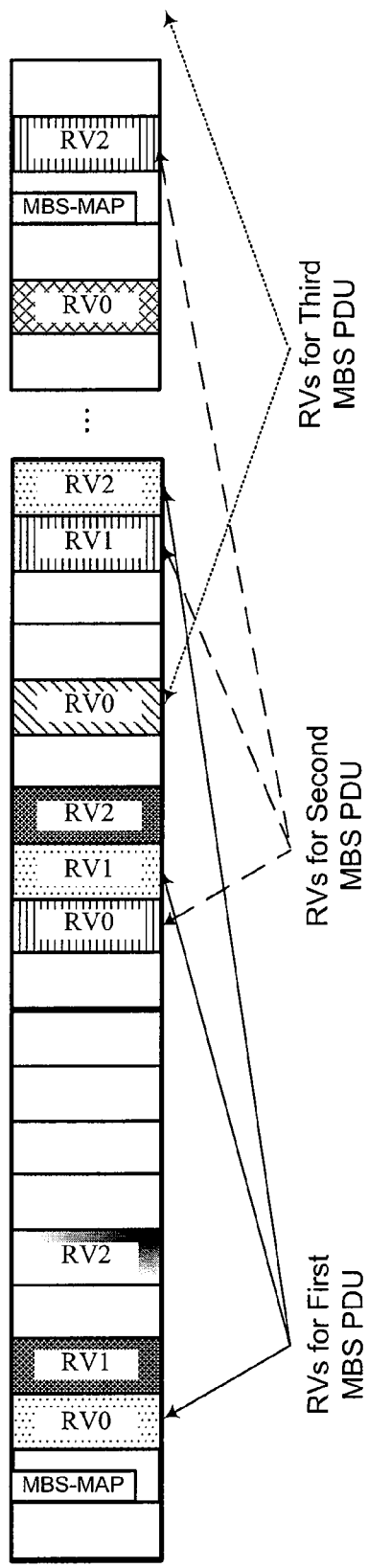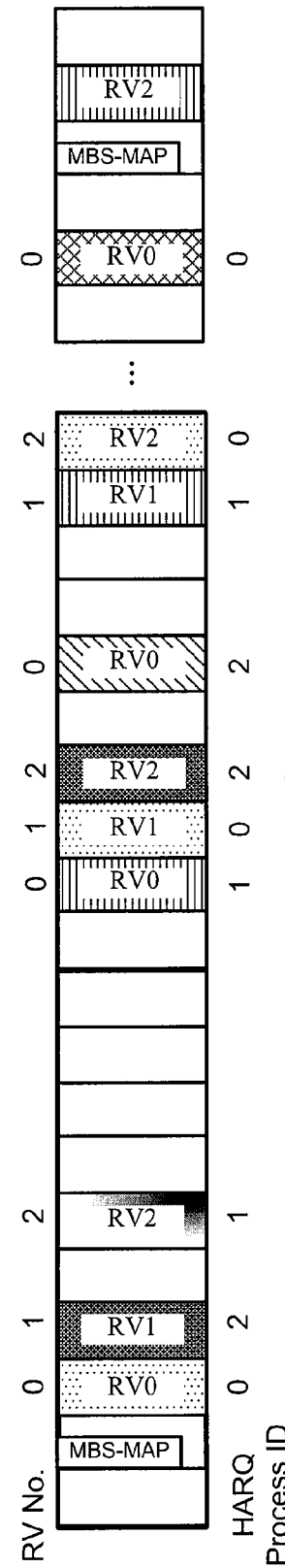
FIG. 8a
FIG. 8b

METHOD AND APPARATUS FOR MULTICAST AND BROADCAST RETRANSMISSION IN WIRELESS COMMUNICATION SYSTEMS

PRIORITY

This application claims the benefit of priority of U.S. Provisional Application No. 61/175,147, filed May 4, 2009, which is incorporated by reference herein in its entirety for any purpose.

TECHNICAL FIELD

The present disclosure relates generally to methods and apparatuses for communication and, more particularly, to methods and apparatuses for multicast and broadcast retransmission wireless communication systems.

BACKGROUND

Wireless communication systems allow wireless devices to communicate without the necessity of wired connections. Because wireless systems have become so integrated into daily life, there is a growing demand for wireless communication systems that support multimedia services such as speech, audio, video, file and web downloading, and the like. Various wireless communication protocols and transmission control mechanisms have been developed to meet the growing demands of multimedia services over wireless communication networks and to improve the performance of these multimedia services.

An exemplary transmission control mechanism for transmitting packet data units (PDUs) in wireless communication systems is Hybrid Automatic Repeat Request (HARQ). Using HARQ, the devices of a wireless system (e.g., transmitting devices, receiving devices, relay devices, etc.) may be configured to retransmit PDUs when the PDU is either not received by the intended recipient or received with errors. Generally, there are two main variants of HARQ retransmission mechanisms supported in wireless communication systems: incremental redundancy (IR) and chase combining. Using IR, a physical (PHY) layer will encode the HARQ packet to generate several versions of encoded subpackets, called redundancy versions. In IR, the encoding process may include the steps of encoding, interleaving, and puncturing, and multiple redundancy versions may be created when the HARQ packet passes through these steps. For chase combining, the PHY layer also encodes the HARQ packet. However, only one version of the encoded packet is generated. Thus, in chase combining, the transmitting device retransmits the same encoded version every time retransmission is required.

Generally, one factor impacting channel quality is the distance between the transmitting device and the receiving device, such as when a receiving device is located near a boundary of a wireless communication cell. Different levels of modulation and coding schemes (MCSs) may be used based on known transmission and/or channel quality information so that more robust MCSs may be used to increase the likelihood that the PDU may successfully be received and decoded by a receiving device. As a result, receiving devices closer to a transmitting device may have better channel quality and be able to successfully decode PDUs using a less robust MCS, whereas receiving devices that are at a greater distance from the transmitting device may have poorer channel quality and will only be able to successfully decode PDUs using a more robust MCS.

When performing point-to-point (PTP) transmissions of PDUs (i.e., from a transmitting device to a single receiving device), a transmitting device may modulate and code a transmission packet for a single receiving device based on channel quality information reported from the single receiving device. However, when performing point-to-multipoint (PTM) transmissions of PDUs (i.e., from a transmitting device to multiple receiving devices), each of the receiving devices may have different downlink channel conditions, and the transmitting device may need to adopt the most robust modulation and coding schemes for transmission to all the receiving devices.

In order to provide every receiving device with an opportunity to correctly receive and decode the packet data, the transmitting device may adopt the most robust MCS capable of successfully transmitting packet data to every member of the group of receiving devices. To do so, the transmitting device may evaluate channel conditions between itself and each of receiving devices and, based on the evaluated channel quality information, determine a modulation and coding scheme for the group of receiving devices within its broadcast range.

Because a transmitting device may use a more robust MCS than is necessary for every receiving device in its range, receiving devices that could successfully receive data transmitted using a less robust MCS may unnecessarily expend resources decoding data transmitted using a more robust MCS. In addition, a receiving device may spend unnecessary resources to receive more copies or redundant bits of a PDU than is necessary to successfully decode the PDU.

The disclosed embodiments are directed to overcoming one or more of the problems set forth above.

SUMMARY

In one exemplary embodiment, the present disclosure is directed to a method for multicast and broadcast (MBS) transmission in a wireless communication system including a set of receiving devices, comprising: encoding, by a transmission device, a plurality of MBS data bits to generate a plurality of MBS data versions; transmitting, to the set of receiving devices, the plurality of MBS data versions, wherein the plurality of MBS data versions are transmitted in a predefined transmission pattern; and transmitting, to the set of receiving devices, identification and decoding information associated with each of the plurality of MBS data versions.

In another exemplary embodiment, the present disclosure is directed to an apparatus for multicast and broadcast (MBS) transmission in a wireless communication system, the apparatus comprising: at least one memory to store data and instructions; and at least one processor configured to access the at least one memory and, when executing the instructions, to: encode, by a transmission device, a plurality of MBS data bits to generate a plurality of MBS data versions; transmit, to the set of receiving devices, the plurality of MBS data versions, wherein the plurality of MBS data versions are transmitted in a predefined transmission pattern; and transmit, to the set of receiving devices, identification and decoding information associated with each of the plurality of MBS data versions.

BRIEF DESCRIPTION OF THE DRAWINGS

FIG. 4a is a diagram showing MBS transmissions in an exemplary wireless communication system, consistent with certain disclosed embodiments;

FIG. 4b is a diagram showing MBS transmissions in an exemplary wireless communication system, consistent with certain disclosed embodiments;

FIG. 7a is a diagram showing MBS transmissions in an exemplary wireless communication system, consistent with certain disclosed embodiments;

FIG. 7b is a diagram showing MBS transmissions in an exemplary wireless communication system, consistent with certain disclosed embodiments;

FIG. 8a is a diagram showing MBS transmissions in an exemplary wireless communication system, consistent with certain disclosed embodiments;

FIG. 8b is a diagram showing MBS transmissions in an exemplary wireless communication system, consistent with certain disclosed embodiments;

DETAILED DESCRIPTION

Figure 1:
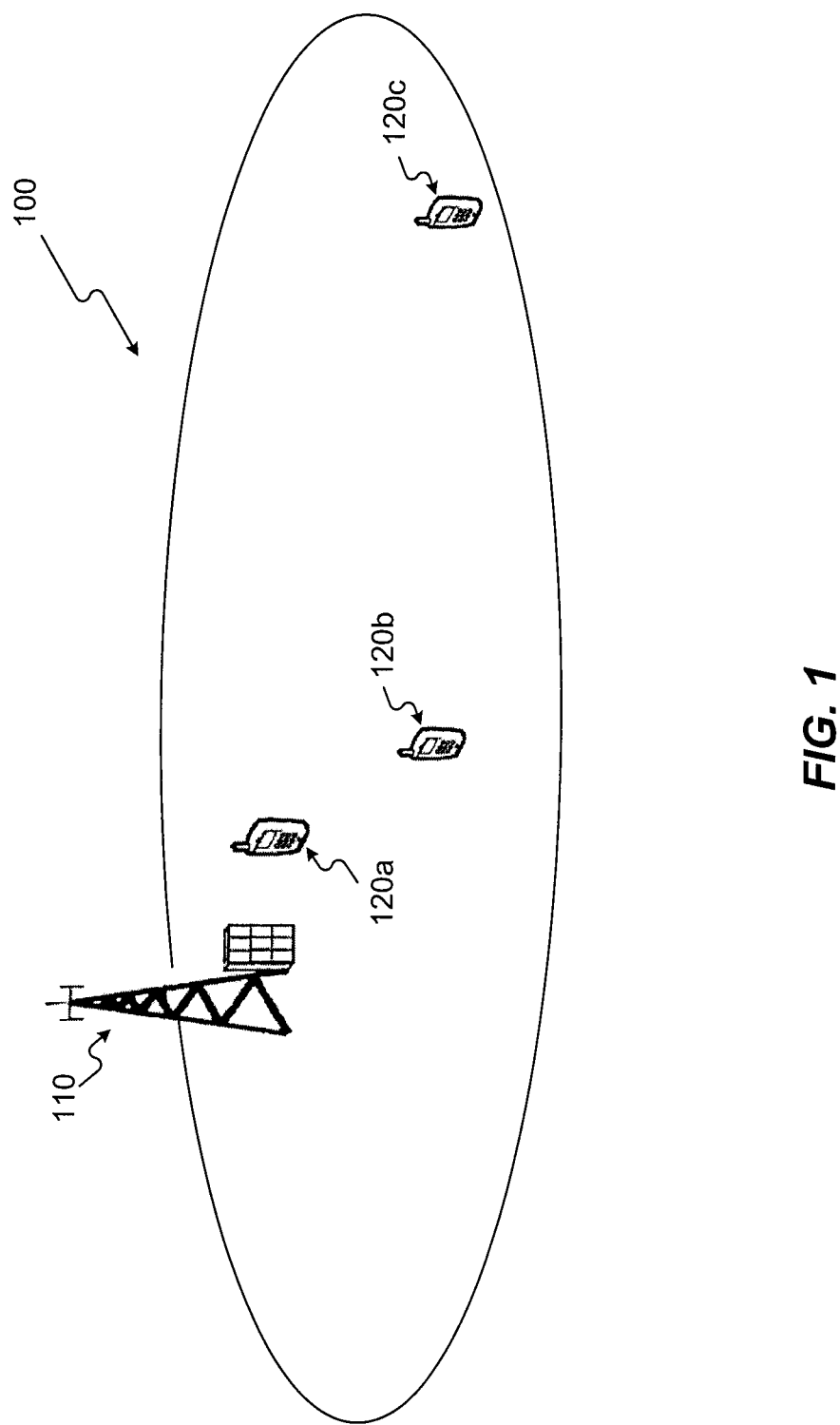
FIG. 1 is a diagram showing multicast and broadcast services (MBS) communication in an exemplary wireless communication system, consistent with certain disclosed embodiments.

FIG. 1 is a diagram of an exemplary wireless communication system 100. In one exemplary embodiment, wireless communication system 100 of FIG. 1 may be based, for example, on the Worldwide Interoperability for Microwave Access (WiMAX), which is promulgated by the WiMax Forum, and is based on the IEEE 802.16 family of standards and technologies. In other embodiments, wireless communication system 100 of FIG. 1 may be based, for example, on the $3^{rd}$ Generation Partnership Project (3GPP) family of standards and technologies. Wireless communication system 100 may utilize a Media Access Control (MAC) frame format using Orthogonal Frequency-Division Multiple Access (OFDMA). In certain exemplary embodiments, the wireless communication system 100 may be used for multicast and broadcast service (MBS) (also referred to as multimedia broadcast multicast service (MBMS)) transmissions.

As shown in FIG. 1, wireless communication system 100 may include one or more transmitting devices (TD) 110, e.g., TD 110, and one or more subscriber stations (SS) 120, e.g., SS 120a, SS 120b, and SS 120c. TD 110 may be any type of communication device configured to transmit and/or receive data and/or communications to and from one or more SSs 120 in wireless communication system 100, many of which are known in the art. In some embodiments, TD 110 may also be referred to as, for example, a Node-B, a base transceiver system (BTS), an access point, a scatter, a home base station, a satellite-based communication base station, etc. In other embodiments, TD 110 may be a relay station, a repeater, an intermediate node, or an intermediary. In one exemplary embodiment, TD 110 may have a broadcast/reception range within which TD 110 may wirelessly communicate with one or more one or more SSs 120. Broadcast ranges may vary due to power levels, location, and interference (physical, electrical, etc.).

Figure 2A:
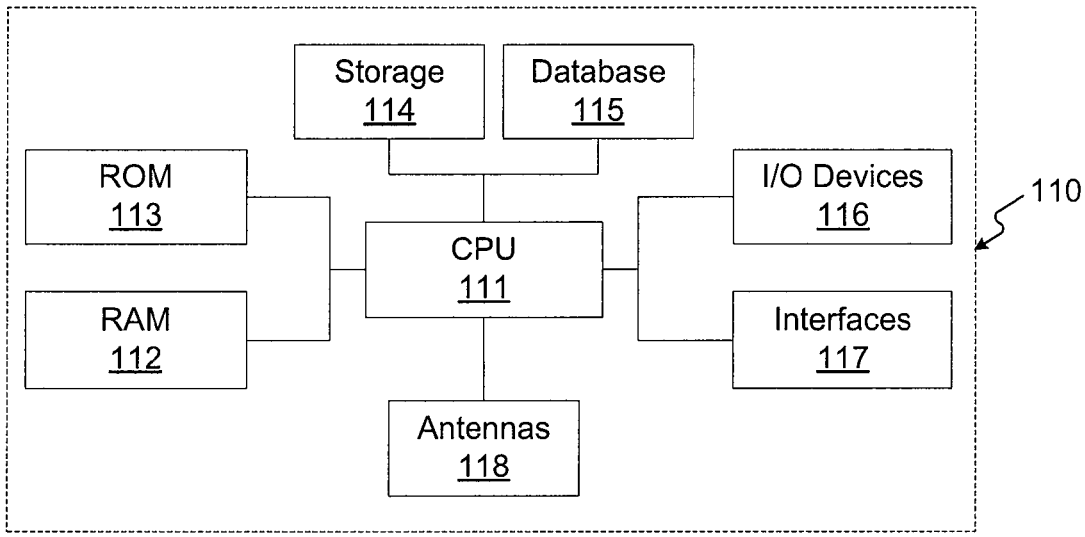
FIG. 2a is a diagram of an exemplary transmitting device (TD), consistent with certain disclosed embodiments.

FIG. 2a is a diagram of an exemplary TD 110, consistent with certain disclosed embodiments. As shown in FIG. 2a, each TD 110 may include one or more of the following components: at least one central processing unit (CPU) 111 configured to execute computer program instructions to perform various processes and methods, random access memory (RAM) 112 and read only memory (ROM) 113 configured to access and store information and computer program instructions, memory 114 to store data and information, databases 115 to store tables, lists, or other data structures, I/O devices 116, interfaces 117, antennas 118, etc. Each of these components is well-known in the art and will not be discussed further.

Although not shown, TD 110 may include one or more mechanisms and/or devices by which TD 110 may perform the methods described herein. For example, TD 110 may include one or more encoders, one or more interleavers, one or more circular buffers, one or more multiplexers, one or more permuters, one or more arithmetic logic units and/or their constituent parts, etc. These mechanisms and/or devices may include any combination of hardware and/or software components and may be included, in whole or in part, in any of the components shown in FIG. 2a.

SS 120 may be any type of computing device configured to wirelessly transmit and/or receive data to and from TD 110 in wireless communication system 100. SS 120 may include, for example, servers, clients, desktop computers, laptop computers, network computers, workstations, personal digital assistants (PDA), tablet PCs, scanners, telephony devices, pagers, cameras, musical devices, etc. In addition, SS 120 may include one or more wireless sensors in a wireless sensor network configured to communicate by means of centralized and/or distributed communication. In one exemplary embodiment, SS 120 may be a mobile computing device. In another exemplary embodiment, SS 120 may be a fixed computing device operating in a mobile environment, such as, for example, a bus, a train, an airplane, a boat, a car, etc.

Figure 2B:
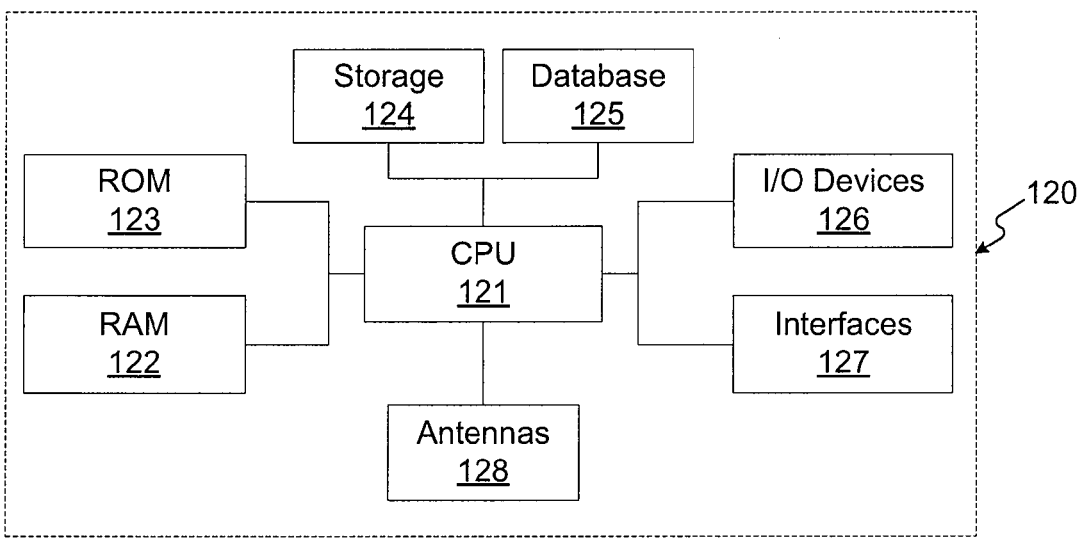
FIG. 2b is a diagram of an exemplary subscriber station (SS), consistent with certain disclosed embodiments.

FIG. 2b is a diagram of an exemplary SS 120, consistent with certain disclosed embodiments. As shown in FIG. 2b, each SS 120 may include one or more of the following components: at least one central processing unit (CPU) 121 configured to execute computer program instructions to perform various processes and methods, random access memory (RAM) 122 and read only memory (ROM) 123 configured to access and store information and computer program instructions, memory 124 to store data and information, databases 125 to store tables, lists, or other data structures, I/O devices 126, interfaces 127, antennas 128, etc. Each of these components is well-known in the art and will not be discussed further.

Although not shown, SS 120 may include one or more mechanisms and/or devices by which SS 120 may perform the methods as described herein. For example, SS 120 may include one or more encoders, one or more interleavers, one or more circular buffers, one or more multiplexers, one or more permuters, one or more arithmetic logic units and/or their constituent parts, etc. These mechanisms and/or devices may include any combination of hardware and/or software components and may be included, in whole or in part, in any of the components shown in FIG. 2b.

In exemplary wireless communication system 100 of FIG. 1, transmissions between TD 110 and SSs 120 may be divided into variable length sub-frames: an uplink (UL) sub-frame and a downlink (DL) sub-frame. Generally, the UL sub-frame may include ranging channels, a channel quality information channel (CQICH), and UL data bursts containing data.

The DL sub-frame may include a preamble, a Frame Control Header (FCH), a DL-MAP, a UL-MAP, a Multicast and Broadcast (MBS)-MAP, and a DL data burst area. The preamble may be used to provide a reference for synchronization. For example, the preamble may be used to adjust a timing offset, a frequency offset, and power. The FCH may contain frame control information for each connection including, for example, decode information for the receiving device.

The DL-MAP and UL-MAP may be used to allocate channel access for both uplink and downlink communication. That is, the DL-MAP may provide a directory of access slot locations within the current downlink sub-frame, and the UL-MAP may provide a directory of access slot locations within the current uplink sub-frame. The MBS-MAP may be used to provide a directory of access slot locations for point-to-multipoint (MBS) data bursts. In the DL-MAP and/or MBS-MAP, the directories may take the form of one or more MAP Information Elements (MAP IEs). Each MAP IE in the DL-MAP or MBS-MAP may contain parameters to identify where a data burst may be located, the length of the data burst, the identity of the intended recipient of the data burst, and one or more transmission parameters.

For example, each MAP IE in the DL-MAP and/or MBS-MAP may contain a Connection ID (CID), identifying the destination device for which a data burst is intended, a Downlink Interval Usage Code (DIUC), representing a downlink interval usage code by which downlink transmission is defined, an OFDMA Symbol Offset, indicating the offset of an OFDMA symbol in which a data burst starts, a sub-channel offset, indicating a lowest-index OFDMA sub-channel for carrying the burst, etc. Other parameters may also be included in the MAP IE such as, for example, a boosting parameter, a parameter indicating a number of sub-channels, a parameter indicating a number of OFDMA symbols, etc. An OFDMA symbol may be the number of carriers equal to the size of a Fourier transform, and may be constructed from data carriers, pilot carriers, null carriers, etc.

The DL-MAP and UL-MAP may each be followed by the data burst area. The data burst area may include one or more data bursts. Each data burst in the data burst area may be modulated and encoded according to the control type of a corresponding connection-switched control data. Generally, the DL-MAP, the UL-MAP, and the MBS-MAP may be referred to as packet data units (PDUs) or, simply, packet data. PDUs may be used to transmit data point-to-point (PTP) and/or point-to-multipoint (PTM).

Figure 3:
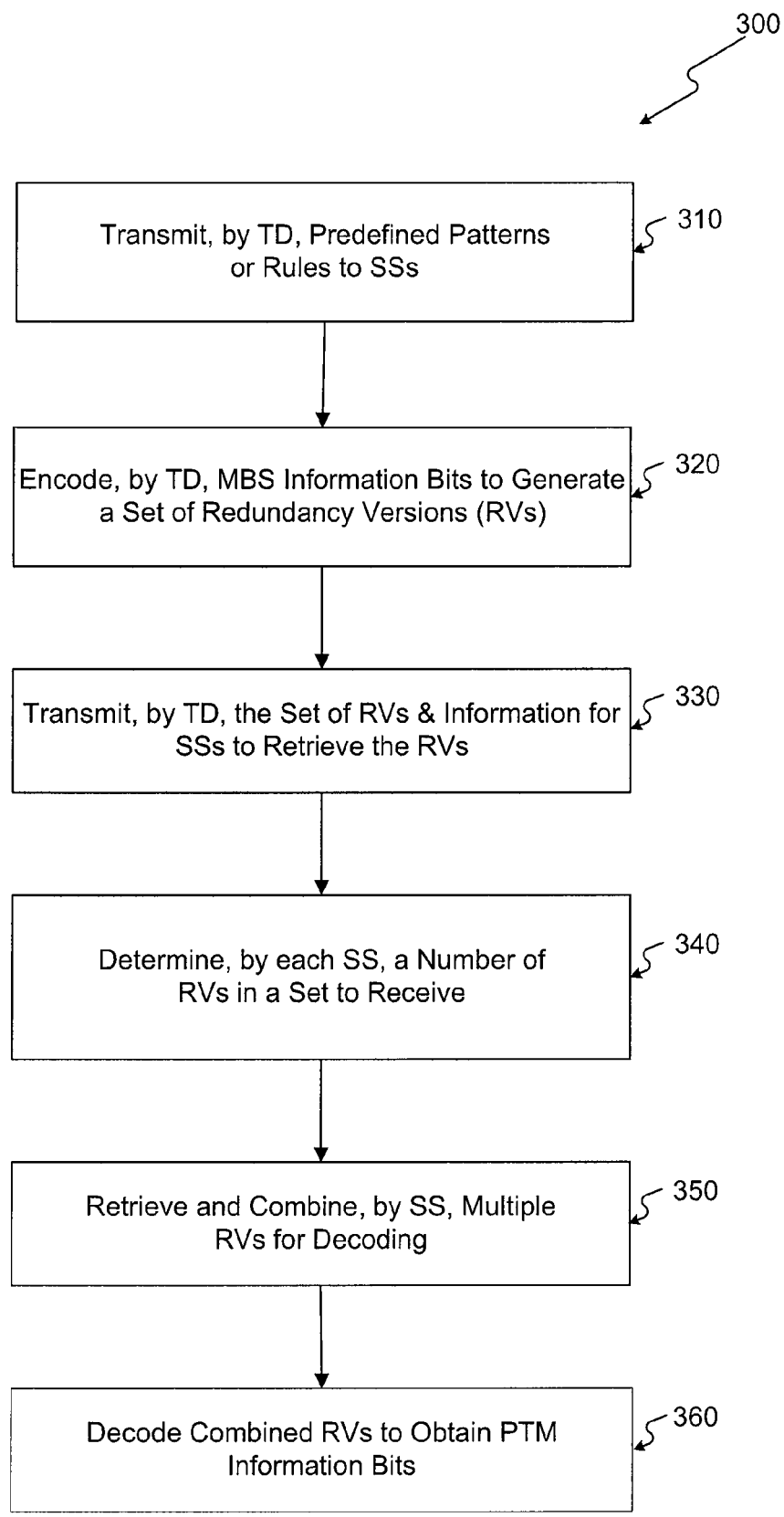
FIG. 3 is a flowchart showing an exemplary MBS transmission and reception, consistent with certain disclosed embodiments.

FIG. 3 is an exemplary flowchart 300 showing MBS data transmission in a wireless communication system, such as wireless communication system 100, consistent with certain disclosed embodiments. Specifically, FIG. 3 shows an embodiment in which a transmitting device (e.g., TD 110) generates a set of MBS retransmission versions (RVs) (e.g., RV0, RV1, RV2, etc.), and each receiving device (e.g., SS 120*a*, SS 120*b*, SS 120*c*, etc.) determines the number of MBS RVs to retrieve based on its channel conditions. In the embodiment of FIG. 3, TD 110 may not wait for an ACK or NACK before retransmitting the current MBS RV or transmitting any subsequently generated MBS RV.

In addition, while three MBS RVs are discussed in connection with FIG. 3, the number of MBS RVs in a set may be more or less. In some embodiments, the number of MBS RVs may be predetermined. In other embodiments, the number of MBS RVs in a set may be determined dynamically. For example, TD 110 may determine the number of MBS RVs to generate based on one or more transmission and channel conditions reported from one or more receiving devices (e.g., SS 120*a*, SS 120*b*, SS 120*c*, etc.). Transmission and channel conditions may include, for example, measured signal strength, channel quality indicator (CQI), signal to interference plus noise ratio (SINR), bit error rate (BER), block error rate (BLER), packet error rate, etc.

In some embodiments, the number of OFDMA symbols for each MBS RV in a set of MBS RVs may be the same (e.g., the number of OFDMA symbols in RV0 is equal to the number of OFDMA symbols in RV1, etc.). In other embodiments, the number of OFDMA symbols for each MBS RV in a set of MBS RVs may be different (e.g., the number of OFDMA symbols in RV0 is not equal to the number of OFDMA symbols in RV1, etc.).

TD 110 may also provide information to identify the sub-frame location of MBS data versions, i.e., MBS RVs, for each MBS transmission by transmitting predefined rules or patterns to SSs 120 (310). For example, TD 110 may store predefined rules or patterns for transmitting MBS RVs, and may communicate the predefined rules or patterns to SSs 120. SSs 120 may use the predefined rules or patterns to locate and retrieve one or more MBS RVs. In some embodiments, TD 110 may provide only MBS RV information of one MBS subframe allocated for transmitting MBS data and, using the predefined rules or patterns, SSs 120 may be able to implicitly determine the other RV information of MBS subframes. In certain disclosed embodiments, the predefined rules or patterns may be transmitted to SSs 120 via multicast broadcast single frequency network (MBSFN) control signaling (e.g., MCCH, MBS-MAP, Private MAP, etc.). Alternatively and/or additionally, the predefined rules or patterns may be transmitted to SSs 120 via cell-specific control signaling (e.g., system information block (SIB), broadcast control channel (BCCH), super frame header (SFH), etc.).

When TD 110 has MBS information bits for MBS transmission, TD 110 may encode the MBS information bits using one or more data recovery schemes to generate multiple RVs (320). For example, TD 110 may generate a set of MBS RVs (e.g., RV0, RV1, RV2, etc.) by passing the MBS information bits through the IR processes (e.g., CTC encoder, interleaver, puncture, modulator, etc.). Each of these MBS RVs may be modulated by any combination of modulation scheme (e.g., BPSK, QPSK, 16-QAM, 64-QAM, etc.) and coding rate (e.g., 1/2, 1/3, 2/3, etc.) to provide different levels of robustness. In some embodiments, each of the MBS RVs may be modulated according to a same modulation scheme and/or coding rate. In other embodiments, one or more of the RVs may have a modulation scheme and/or coding rate that is different than one or more other RVs.

Once TD 110 has encoded and modulated the MBS information bits to achieve a set of MBS RVs, TD 110 may transmit the set of MBS RVs to one or more receiving devices (e.g., SS 120*a*, SS 120*b*, SS 120*c*, etc.) (330). In some embodiments, the set of MBS RVs may be sent in an order corresponding to their sequence order (e.g., RV0, RV1, RV2, etc.). In other embodiments, the set of MBS RVs may be sent in an order different than their sequence order (e.g., RV0, RV2, RV1, etc.). In some embodiments, the MBS RVs in a set of MBS RVs may be sent by using time division multiplexing (TDM). In some embodiments, the MBS RVs in a set of MBS RVs may be sent by using frequency division multiplexing (FDM). In other embodiments, the MBS RVs in a set of MBS RVs may be sent by using hybrid TDM and FDM. The MBS RVs in a set of MBS RVs may also be sent by using code division multiplexing (CDM), and/or media access control (MAC) layer multiplexing. In addition, the set of MBS RVs may all be sent on a same channel or on different channels.

In addition, TD 110 may provide information for each of the one or more SSs 120 to locate and retrieve the transmitted set of MBS RVs within one or more data burst areas. The location information may, for example, be found in a MAC header. In some embodiments, the location information may be provided in one or more MAP IEs (e.g., DL-MAP IEs, MBS-MAP IEs, etc.). In other embodiments, the location information may be provided in multicast control channels (e.g., MCCH, etc.). Furthermore, the location information may be in the same PDU that contains one or more MBS RVs of the set of MBS RVs or in any previously transmitted PDU.

SS 120 may retrieve one or more MBS RVs of the set of MBS RVs contiguously and/or separately. For example, while multiple MBS RVs may be sent via multiple PDUs, when retrieving the MBS RVs contiguously, SS 120 may retrieve all the desired MBS RVs during one retrieval. In addition, when retrieving the desired MBS RVs contiguously, SS 120 may make a single determination to retrieve the multiple MBS RVs. In some embodiments, when retrieving MBS RVs contiguously, each SS 120 may, in turn, determine a number of MBS RVs to retrieve (340). A determination of the number of MBS RVs that each SS 120 retrieves may be made based on one or more transmission and/or channel conditions associated with that particular SS 120, including, for example, measured signal strength, CQI, SINR, BER, BLER, packet error rate, etc. In other embodiments, a determination of the number of MBS RVs that each SS 120 retrieves may be made based on one or more previous experiences by that SS 120. For example, an SS 120 may determine the number of MBS RVs to retrieve based on a number of previous MBS RVs utilized for successfully decoding MBS data in one or more previous transmissions.

When retrieving MBS RVs separately, SS 120 may retrieve and attempt to decode a first retrieved MBS RV before deciding to retrieve one or more additional MBS RVs. That is, SS 120 may retrieve a first MBS RV and, if SS 120 is unable to successfully decode the first MBS RV, SS 120 may decide to retrieve a second MBS RV. Similarly, if SS 120 retrieves the second MBS RV, but is unable to successfully decode the second MBS RV, SS 120 may determine to retrieve a third MBS RV. In some embodiments, SS 120 may determine to selectively retrieve one or more MBS RVs in a sequence (e.g., RV0, RV0 and RV2, RV1 and RV2, etc.). In other embodiments, SS 120 may determine to retrieve the MBS RVs in sequence order (e.g., RV0, RV0 and RV1, RV0 and RV1 and RV2, etc.). SSs 120 may be configured to retrieve the one or more MBS RVs in a sequence order different or the same as any other SS 120. The MBS RVs may be retrieved from one or more data bursts in a radio frame.

Once SS 120 has determined the number of MBS RVs that it will retrieve, SS 120 may retrieve and, in some embodiments, combine the determined MBS RVs (350). Once the MBS RVs are combined, SS 120 may decode the retrieved and combined MBS RVs to obtain the MBS information bits (360). Combination of MBS RVs and decoding may be performed using any method of combining and decoding data, many of which are known in the art.

FIG. 4a is a diagram showing an example of radio resource (e.g., subframes) allocation for MBS PDU transmissions (e.g., RVs) during a scheduling interval, consistent with certain disclosed embodiments. As shown in FIG. 4a, a transmitting device, such as TD 110 of FIG. 1, may provide a bitmap for the allocation of MBS subframes in an MBS-MAP. In the embodiment of FIG. 4a, each of the MBS subframes may contain an MBS PDU RV. In embodiments based on the 3GPP family of standards, TD 110 may provide a bitmap for the allocation of MBS subframes in a multicast control channel (MCCH), and each bit in the bitmap represents whether the corresponding subframe is allocated for MBS transmission. For example, bit n is set to "1" if the n-th subframe following the MBS-MAP is allocated for MBS transmission data, but bit n may be set to "0" if the n-th subframe following the MBS-MAP is not allocated for the MBS transmission data.

FIG. 4b is diagram showing another example of radio resource (e.g., subframes) allocation for MBS PDU transmissions during a scheduling interval, consistent with certain disclosed embodiments. The allocation of radio resources shown in FIG. 4b may be used, for example, when all radio resources are used for MBS transmissions (i.e., an MBS-dedicated carrier). As shown in FIG. 4b, a set of subframes containing multiple RVs for a particular PDU may be allocated contiguously. Thus, data in the MBS-MAP may include a parameter identifying an "index of starting subframe" and/or a parameter identifying a "total number of allocated subframes" for an MBS PDU transmission. For example, referring to MBS PDU #2 in FIG. 4b, data in the MBS-MAP may indicate the index of the starting subframe of MBS PDU #2 is 8, and the total number of subframes allocated to MBS PDU #2 is 5. Similarly, referring to MBS PDU #6, data in the MBS-MAP may indicate the index of the starting subframe for MBS PDU #6 is 13, and the total number of subframes allocated to MBS PDU #6 is 6. In some embodiments, when the transmission order of the sets of MBS subframes is known and the transmission is contiguous, the parameter identifying the "index of starting subframe" may not be utilized because the index of a starting subframe of a target set of MBS transmissions can be calculated as the sum of the total number subframes transmitted before the target set of MBS transmissions.

Figure 5:
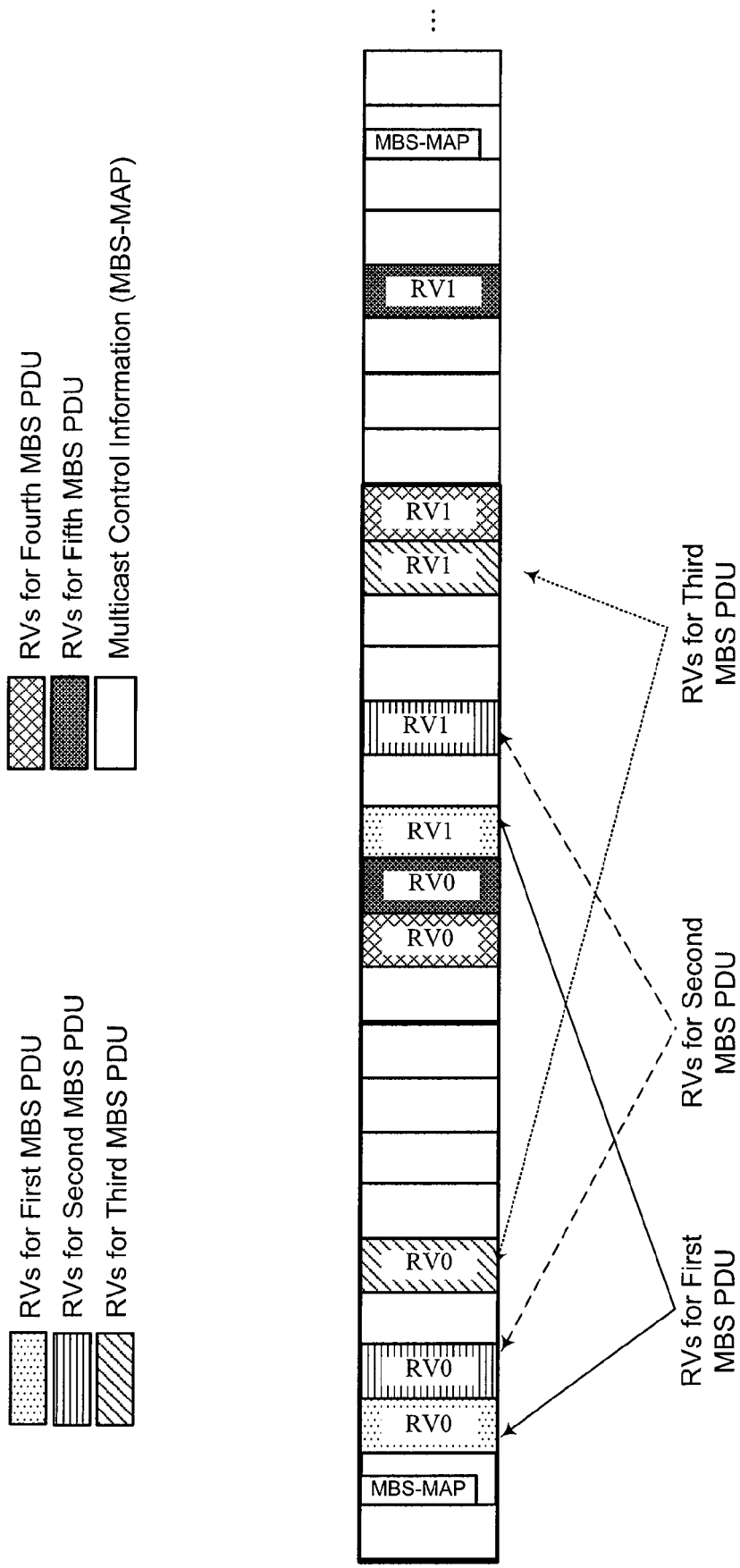
FIG. 5 is a diagram showing MBS transmissions in an exemplary wireless communication system, consistent with certain disclosed embodiments.

FIG. 5 is an exemplary pattern that may be used by TD 110 to transmit MBS RVs to SSs 120, consistent with certain disclosed embodiments. As shown in FIG. 5, TD 110 may transmit a first set of MBS RVs (e.g., RV0s) corresponding to several different MBS PDUs in a first set of MBS subframes, and transmit a second set of MBS RVs (e.g., RV1s) corresponding to the same several different MBS PDUs in a second set of MBS subframes.

While FIG. 5 shows two MBS RVs, this pattern may be applied to greater numbers of MBS RVs as well. For example, when transmitting three MBS RVs, TD 110 may transmit a first set of MBS RVs (e.g., RV0s) corresponding to several different MBS PDUs in a first set of MBS subframes, transmit a second set of MBS RVs (e.g., RV1s) corresponding to the same several different MBS PDUs in a second set of MBS subframes, and transmit a third set of MBS RVs (e.g., RV2s) corresponding to the same several different MBS PDUs in a third set of MBS subframes. Moreover, while FIG. 5 shows MBS RVs sent in the order of RV0, RV1, and RV2, other ordering may also be used (e.g., RV2, RV0, RV1, etc.).

A number of parameters may be used to identify and decode the MBS RVs transmitted by TD 110 in FIG. 5. Any one or more of these parameters may be provided by cell-specific control signaling (e.g., SIB, BCCH, SFH, etc.) and/or MBSFN control signaling (e.g., MCCH, MBS MAP, Private MAP, etc.). In the embodiment of FIG. 5, the parameters may include, for example, "message type" or "pattern mode" and/or "number of RVs." These parameters may be transmitted directly, or may be determined implicitly from one or more other parameters. In some embodiments, these parameters may be communicated to each SS 120 when it joins the service.

In the embodiment of FIG. 5, MBS-MAP (i.e., multicast control information) may include a parameter, herein referred to as "message type" or "pattern mode," to identify the pattern used to transmit the MBS RVs. MBS-MAP may also provide a parameter that identifies the number of MBS RVs for an MBS PDU. In some embodiments, however, the number of MBS RVs may be implicitly determined from the "message type" or "pattern mode" parameter. In other embodiments, the parameter identifying the number of RVs may be replaced by an equivalent parameter, e.g., "number of partitions" of MBS subframes.

Figure 6:
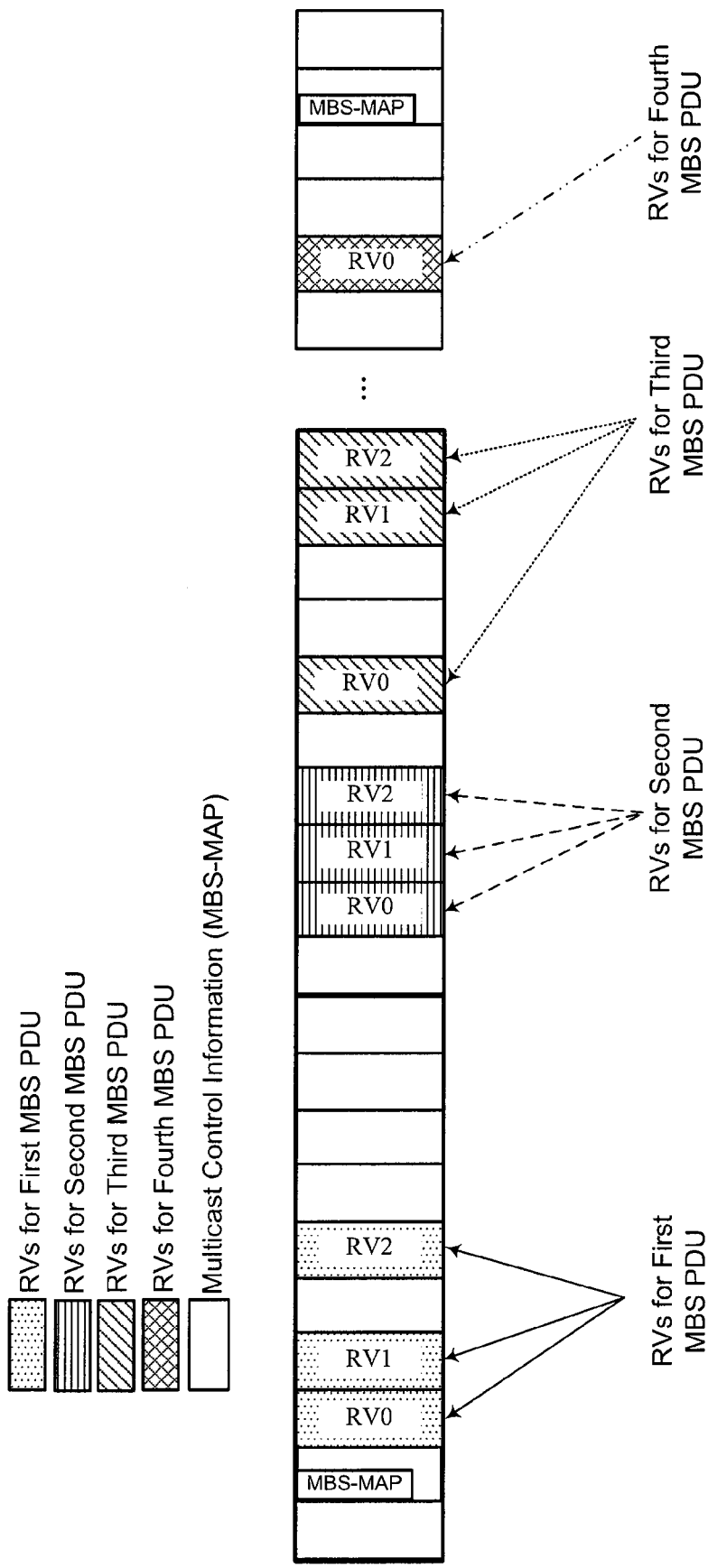
FIG. 6 is a diagram showing MBS transmissions in an exemplary wireless communication system, consistent with certain disclosed embodiments.

FIG. 6 is an exemplary pattern that may be used by TD 110 to transmit MBS RVs to SSs 120, consistent with certain disclosed embodiments. As shown in FIG. 6, TD 110 may transmit MBS RVs in logically contiguous MBS radio resources (e.g., MBS subframes) that are allocated to transmit the MBS services. For example, as shown by FIG. 6, subframes 1, 2, 4, 10, 11, 12, 14, 17, and 18 following the MBS-MAP may be allocated for MBS transmissions, while subframes 3, 5-9, 13, 15, and 16 may not be allocated for MBS transmissions. Thus, as shown in FIG. 6, the MBS RVs associated with a first MBS PDU may be transmitted in subframes 1, 2, and 4, the MBS RVs associated with a second MBS PDU may be transmitted in subframes 10, 11, and 12, the MBS RVs associated with a third MBS PDU may be transmitted in subframes 13, 15, and 16, and the MBS RVs associated with a fourth MBS PDU may be transmitted in subframes 24, 25, and 28 (subframes 25 and 28 not shown).

A number of parameters may be used to identify and decode the MBS RVs transmitted by TD 110 in FIG. 6. Any one or more of these parameters may be provided by cell-specific control signaling (e.g., SIB, BCCH, SFH, etc.) and/or MBSFN control signaling (e.g., MCCH, MBS MAP, Private MAP, etc.). In the embodiment of FIG. 6, the parameters may include, for example, "message type" or "pattern mode," "number of RVs," and/or "RV number." These parameters may be transmitted directly, or may be determined implicitly from one or more other parameters. In some embodiments, these parameters may be communicated to each SS 120 when it joins the service.

For example, MBS-MAP (i.e., multicast control information) may include a parameter, herein referred to as "message type" or "pattern mode," to identify the pattern used to transmit the MBS PDUs. MBS-MAP may also include a parameter identifying the "number of RVs" for an MBS PDU. In some embodiments, the number of RVs may be implicitly determined from the "message type" or "pattern mode" parameter. In other embodiments, the number of RVs parameter may be replaced by an equivalent parameter, e.g., "number of partitions" of MBS subframes.

In certain embodiments, the parameter "RV number" may be communicated to SSs 120 to identify at least one of the MBS subframes that follow the multicast control information (e.g., MBS-MAP, MCCH, etc.). For example, TD 110 may indicate the "RV number" of an MBS PDU transmitted on the first MBS subframe following the multicast control information (i.e., RV0 in FIG. 6). In some embodiments, the MBS transmission may begin with a pre-defined RV number, and the TD 110 may not separately and/or additionally transmit a parameter identifying the "RV number." For example, TD 110 may begin every MBS transmission with RV0 in any given scheduling period. In some embodiments, when the MBS transmissions begin with a pre-defined RV number, the pre-defined RV number may be implicitly indicated by the "message type" parameter.

FIGS. 7*a* and 7*b* show an exemplary pattern that may be used by TD 110 to transmit MBS RVs to SSs 120, consistent with certain disclosed embodiments. As shown in FIGS. 7*a* and 7*b*, TD 110 may transmit a first set of MBS RVs (e.g., RV0s) corresponding to several different MBS PDUs in a first set of MBS subframes, transmit a second set of MBS RVs (e.g., RV1s) corresponding to the same several different MBS PDUs in a second set of MBS subframes, and transmit a third set of MBS RVs (e.g., RV2s) corresponding to the same several different MBS PDUs in a third set of MBS subframes. In addition, TD 110 may also provide the HARQ process id (e.g., 0, 1, and 2), corresponding to the HARQ process number. Thus, as shown in FIG. 7*b*, a first set of MBS RVs (e.g., RV0s) may be transmitted sequentially in a first set of MBS subframes based on their HARQ process id numbers (e.g., 0, 1, 2). Similarly, a second set of MBS RVs (e.g., RV1s) may be transmitted sequentially in a second set of MBS subframes based on their HARQ process id numbers (e.g., 0, 1, 2), and a third set of MBS RVs (e.g., RV2s) may be transmitted sequentially in a third set of MBS subframes based on their HARQ process id numbers (e.g., 0, 1, 2). While FIGS. 7*a* and 7*b* show three MBS RVs with three HARQ process ids, this pattern may also be applied to greater or lesser numbers of MBS RVs and HARQ process ids. Moreover, while FIGS. 7*a* and 7*b* show MBS RVs sent in the order of RV0, RV1, and RV2, other ordering may also be used (e.g., RV2, RV0, RV1, etc.).

A number of parameters may be used to identify and decode the MBS RVs transmitted by TD 110 in FIGS. 7*a* and 7*b*. Any one or more of these parameters may be provided by cell-specific control signaling (e.g., SIB, BCCH, SFH, etc.) and/or MBSFN control signaling (e.g., MCCH, MBS MAP, Private MAP, etc.). In the embodiment of FIGS. 7*a* and 7*b*, the parameters may include, for example, "message type" or "pattern mode," "number of RVs," "number of HARQ processes," "RV number," and/or "HARQ process id number." These parameters may be transmitted directly, or may be determined implicitly from one or more other parameters. In some embodiments, these parameters may be communicated to each SS 120 when it joins the service.

For example, MBS-MAP may include a parameter, herein referred to as "message type" or "pattern mode," to identify the pattern used to transmit the MBS RVs. MBS-MAP may also include a parameter identifying the "number of RVs" for an MBS PDU. In some embodiments, the number of RVs may be implicitly determined from the "message type" or "pattern mode" parameter. In other embodiments, the number of RVs parameter may be replaced by an equivalent parameter, e.g., "number of partitions" of MBS subframes. In addition, MBS-MAP may include a parameter identifying a number of HARQ processes (e.g., 0, 1, 2, etc.). In some embodiments, the parameter identifying the number of HARQ processes may be replaced by an equivalent parameter, such as, for example, a "periodicity" or a "distance" to indicate the periodicity of the transmission for MBS RVs corresponding to the same MBS PDU. In other embodiments, the parameter identifying the number of HARQ processes may be implicitly determined from the "message type" or "pattern mode" parameter.

In certain embodiments, the parameter "RV number" may be communicated to SSs 120 to identify at least one of the MBS subframes that follow the multicast control information (e.g., MBS-MAP, MCCH, etc.). For example, TD 110 may indicate the "RV number" of an MBS PDU transmitted on the first MBS subframe following the multicast control information (i.e., RV0 in FIGS. 7*a* and 7*b*). In some embodiments, the MBS transmission may begin with a pre-defined RV number, and the TD 110 may not separately and/or additionally transmit a parameter identifying the "RV number." For example, TD 110 may begin every MBS transmission with RV0 in any given scheduling period. In some embodiments, when the MBS transmissions begin with a pre-defined RV number, the pre-defined RV number may be implicitly indicated by the "message type" parameter.

Similarly, in certain embodiments, the parameter "HARQ process id" may be communicated to SSs 120 to identify the first HARQ process id that follows the multicast control information (e.g., MBS-MAP, MCCH, etc.). For example, TD 110 may indicate the "HARQ process id" of an MBS PDU transmitted on the first MBS subframe following the multicast control information (i.e., 0 in FIGS. 7*a* and 7*b*). In some embodiments, the MBS transmission may begin with a pre-defined HARQ process id, and the TD 110 may not separately and/or additionally transmit a parameter identifying the "HARQ process id." For example, TD 110 may begin every MBS transmission with HARQ process id=0 in any given scheduling period. In some embodiments, when the MBS transmissions begin with a pre-defined HARQ process id, the pre-defined HARQ process id may be implicitly indicated by the "message type" parameter. In addition, with the RV number and HARQ process id of the first MBS subframe, SS 120 can determine the RV number and HARQ process id of other MBS subframes.

FIGS. 8*a* and 8*b* show an exemplary pattern that may be used by TD 110 to transmit MBS RVs to SSs 120, consistent with certain disclosed embodiments. As shown in FIGS. 8*a* and 8*b*, TD 110 may transmit a first set of MBS RVs (e.g., RV0, RV1, RV1), each MBS RV of the first set of MBS RVs corresponding to a different MBS PDU (e.g., First MBS PDU, Fifth MBS PDU, Sixth MBS PDU) in a first set of MBS subframes, transmit a second set of MBS RVs (e.g., RV0, RV1, RV2), each MBS RV of the second set of MBS RVs corresponding to a different MBS PDU (e.g., Second MBS PDU, First MBS PDU, Fifth MBS PDU) in a second set of MBS subframes, and transmit a third set of MBS RVs (e.g., RV0, RV1, RV2), each MBS RV of the third set of MBS RVs corresponding to a different MBS PDU (e.g., Third MBS PDU, Second MBS PDU, First MBS PDU) in a third set of MBS subframes. In addition, TD 110 may also provide the HARQ process id (e.g., 0, 1, and 2), corresponding to the HARQ process number. Thus, as shown in FIG. 8*b*, a first set of MBS RVs (e.g., RV0 of a First MBS PDU, RV1 of a Fifth MBS PDU, and RV2 of a Sixth MBS PDU) may be transmitted sequentially in a first set of MBS subframes along with their HARQ process id numbers (e.g., 0, 2, 1). Similarly, a second set of MBS RVs (e.g., RV0 of a Second MBS PDU, RV1 of the First MBS PDU, and RV2 of the Fifth MBS PDU) may be transmitted sequentially in a second set of MBS subframes along with their HARQ process id numbers (e.g., 1, 0, 2), and a third set of MBS RVs (e.g., RV0 of a Third MBS PDU, RV1 of the Second MBS PDU, and RV2 of the First MBS PDU) may be transmitted sequentially in a third set of MBS subframes along with their HARQ process id numbers (e.g., 0, 1, 2). While FIGS. 8*a* and 8*b* show three MBS RVs with three HARQ process ids, this pattern may also be applied to greater or lesser numbers of MBS RVs and HARQ process ids. Moreover, while FIGS. 8*a* and 8*b* show MBS RVs sent in the order of RV0, RV1, and RV2, other ordering may also be used (e.g., RV2, RV0, RV1, etc.).

A number of parameters may be used to identify and decode the MBS RVs transmitted by TD 110 in FIGS. 8*a* and 8*b*. Any one or more of these parameters may be provided by cell-specific control signaling (e.g., SIB, BCCH, SFH, etc.) and/or MBSFN control signaling (e.g., MCCH, MBS MAP, Private MAP, etc.). In the embodiment of FIGS. 8*a* and 8*b*, the parameters may include, for example, "message type" or "pattern mode," "number of RVs," "number of HARQ processes," "RV number," and/or "HARQ process id number." These parameters may be transmitted directly, or may be determined implicitly from one or more other parameters. In some embodiments, these parameters may be communicated to each SS 120 when it joins the service.

For example, MBS-MAP may include a parameter, herein referred to as "message type" or "pattern mode," to identify the pattern used to transmit the MBS RVs. MBS-MAP may also include a parameter identifying the "number of RVs" for each MBS PDU. In some embodiments, the number of RVs may be implicitly determined from the "message type" or "pattern mode" parameter. In other embodiments, the number of RVs parameter may be replaced by an equivalent parameter, e.g., "number of partitions" of MBS subframes. In addition, MBS-MAP may include a parameter identifying a number of HARQ processes (e.g., 0, 1, 2, etc.). In some embodiments, the parameter identifying the number of HARQ processes may be replaced by an equivalent parameter, such as, for example, a "periodicity" or a "distance" to indicate the periodicity of the transmission for MBS RVs corresponding to the same MBS PDU. In other embodiments, the parameter identifying the number of HARQ processes may be implicitly determined from the "message type" or "pattern mode" parameter.

In certain embodiments, the parameter "RV number" may be communicated to SSs 120 to identify at least one of the MBS subframes that follow the multicast control information (e.g., MBS-MAP, MCCH, etc.). For example, TD 110 may indicate the "RV number" of an MBS PDU transmitted in the first MBS subframe following the multicast control information (i.e., RV0 in FIGS. 8*a* and 8*b*). In some embodiments, the MBS transmission may begin with a pre-defined RV number, and the TD 110 may not separately and/or additionally transmit a parameter identifying the "RV number." For example, TD 110 may begin every MBS transmission with RV0 in any given scheduling period. In some embodiments, when the MBS transmissions begin with a pre-defined RV number, the pre-defined RV number may be implicitly indicated by the "message type" parameter.

Similarly, in certain embodiments, the parameter "HARQ process id" may be communicated to SSs 120 to identify the first HARQ process id that follows the multicast control information (e.g., MBS-MAP, MCCH, etc.). For example, TD 110 may indicate the "HARQ process id" of an MBS PDU transmitted on the first MBS subframe following the multicast control information (i.e., 0 in FIGS. 8*a* and 8*b*). In some embodiments, the MBS transmission may begin with a pre-defined HARQ process id, and the TD 110 may not separately and/or additionally transmit a parameter identifying the "HARQ process id." For example, TD 110 may begin every MBS transmission with HARQ process id=0 in any given scheduling period. In some embodiments, when the MBS transmissions begin with a pre-defined HARQ process id, the pre-defined HARQ process id may be implicitly indicated by the "message type" parameter. In addition, with the RV number and HARQ process id of the first MBS subframe, SS 120 can determine the RV number and HARQ process id of other MBS subframes.

Figure 9:
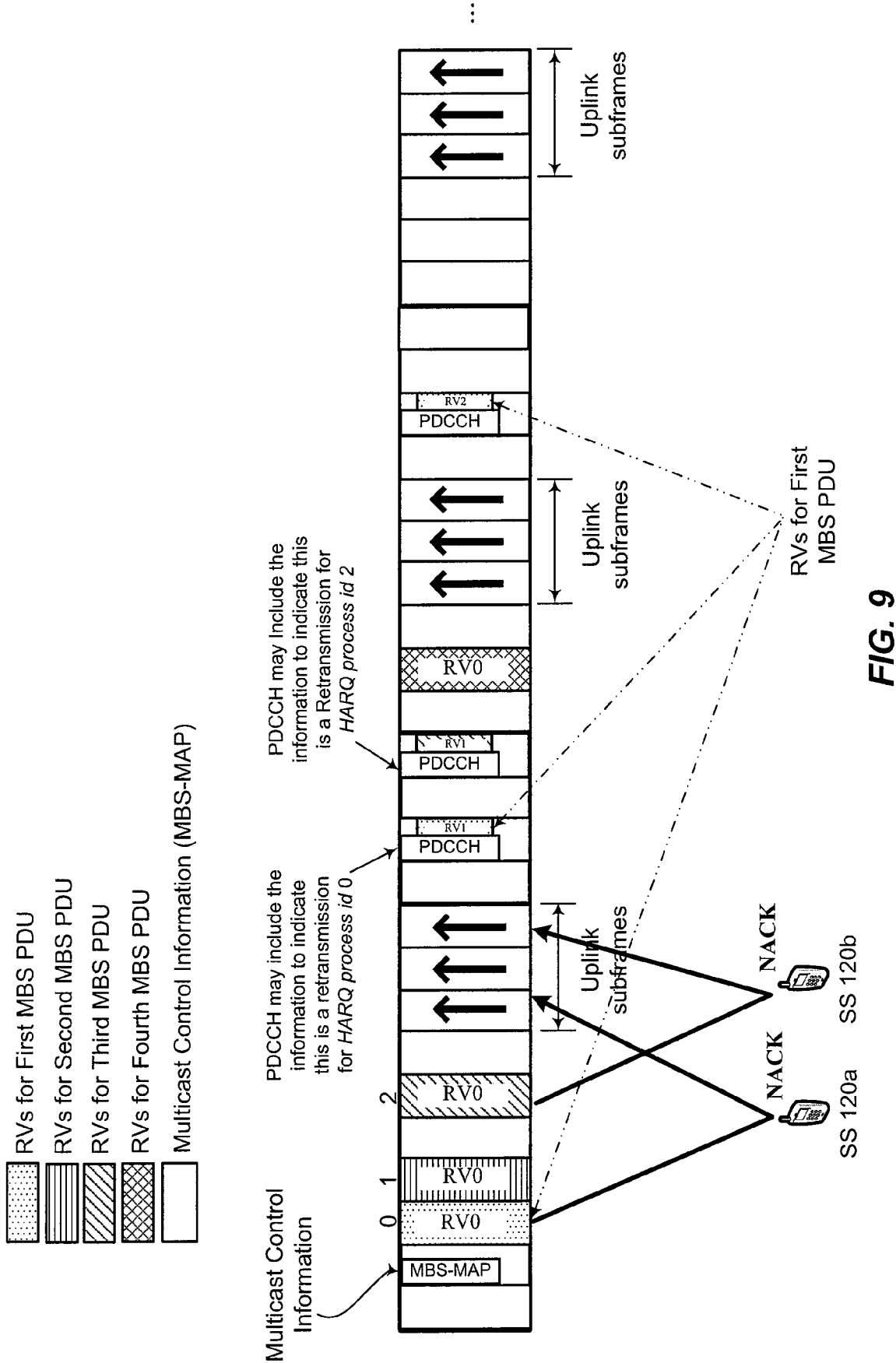
FIG. 9 is a diagram showing MBS transmissions in an exemplary wireless communication system, consistent with certain disclosed embodiments.

FIG. 9 shows an exemplary pattern that may be used by TD 110 to transmit MBS RVs to SSs 120, consistent with certain disclosed embodiments. As shown in FIG. 9, a transmitting device (e.g., TD 110) may retransmit an MBS PDU based on feedback received from a receiving device (e.g., SS 120). To implement this embodiment, a transmitting device (e.g., TD 110) may provide a feedback channel configuration for ACK/NACK feedback in cell-specific control signaling (e.g., SIB, BCCH, SFH, etc.). In addition, the transmitting device may allocate an uplink resource for each HARQ process; allocate an uplink resource for an MBS subframe; and allocate an uplink resource for counting the number of errors. The uplink resource may be an orthogonal code (e.g., RACH signatures, CDMA ranging codes, etc.) or a UL slot. In some embodiments, the transmitting device may transmit this information in an MBS-MAP or MCCH.

As shown by FIG. 9, a first MBS RV transmission may be transmitted by multi-cell transmission mode (e.g., MBSFN), while any subsequent MBS RV transmissions (e.g., retransmissions) may be based on single-cell transmission mode (SC-PTM) or multi-cell transmission mode (MC-PTM). In the exemplary embodiment of FIG. 9, retransmission is based on SC-PTM. Thus, as shown in FIG. 9, TD 110 may transmit RV0 of a first MBS PDU to SS 120*a* and RV0 of a third MBS PDU to SS 120*b*. SS 120*a* may indicate that the transmission was not received or was received with errors by transmitting a NACK in an uplink subframe. Similarly, SS 120*b* may indicate that the transmission was not received or was received with errors by transmitting a NACK in another uplink subframe.

In response to a received NACK, TD 110 may transmit RV1 of the first MBS PDU to SS 120*a* along with control information contained in the Physical Downlink Control Channel (PDCCH), and TD 110 may transmit RV1 of the third MBS PDU to SS 120*b* along with control information contained in the PDCCH. In some embodiments, the multicast control information (e.g., MBS-MAP, MCI, etc.) and PDDCH may use the same identity to represent transmission of the same service. In other embodiments, the multicast control information may use a first identity while PDCCH may use a second identity to represent the transmission of the same service. When the identities are different between the MCI and PDCCH, the Broadcast Control Channel (BCCH) may provide an identity mapping table to provide a mapping between the first and second identities.

The RVs of the first transmission and any re-transmissions may be generated by a same or different MCSs. For example, the MBS RV of a first MBS PDU may be generated by HARQ encoder, interleaver, puncturing processes, but MBS RVs of one or more re-transmissions may be generated by a network coding scheme (e.g., time division duplexing (TDD), frequency division duplexing (FDD), etc.).

A number of parameters may be used to identify and decode the MBS RVs transmitted by TD 110 in FIG. 9. Any one or more of these parameters may be provided by cell-specific control signaling (e.g., SIB, BCCH, SFH, etc.) and/or MBSFN control signaling (e.g., MCCH, MBS MAP, Private MAP, etc.). In the embodiment of FIG. 9, the parameters may include, for example, "message type" or "pattern mode," "number of RVs," "number of HARQ processes," "RV number," and/or "HARQ process id number." These parameters may be transmitted directly, or may be determined implicitly from one or more other parameters. In some embodiments, these parameters may be communicated to each SS 120 when it joins the service.

For example, MBS-MAP may include a parameter, herein referred to as "message type" or "pattern mode," to identify the pattern used to transmit the MBS RVs. MBS-MAP may also include a parameter identifying the "number of RVs" associated with an MBS PDU. In some embodiments, the number of RVs may be implicitly determined from the "message type" or "pattern mode" parameter. In other embodiments, the number of RVs parameter may be replaced by an equivalent parameter, e.g., "number of partitions" of MBS subframes.

In certain embodiments, the parameter "RV number" may be communicated to SSs 120 to identify at least one of the MBS subframes that follow the multicast control information (e.g., MBS-MAP, MCCH, etc.). For example, TD 110 may indicate the "RV number" of an MBS PDU transmitted on the first MBS subframe following the multicast control information (i.e., RV0 in FIG. 9). In some embodiments, the MBS transmission may begin with a pre-defined RV number, and the TD 110 may not separately and/or additionally transmit a parameter identifying the "RV number." For example, TD 110 may begin every MBS transmission with RV0 in any given scheduling period. In some embodiments, when the MBS transmissions begin with a pre-defined RV number, the pre-defined RV number may be implicitly indicated by the "message type" parameter.

Similarly, in certain embodiments, the parameter "HARQ process id" may be communicated to SSs 120 to identify the first HARQ process id that follows the multicast control information (e.g., MBS-MAP, MCCH, etc.). For example, TD 110 may indicate the "HARQ process id" of an MBS PDU transmitted in the first MBS subframe following the multicast control information (i.e., 0 in FIG. 9). In some embodiments, the MBS transmission may begin with a pre-defined HARQ process id, and the TD 110 may not separately and/or additionally transmit a parameter identifying the "HARQ process id." For example, TD 110 may begin every MBS transmission with HARQ process id=0 in any given scheduling period. In some embodiments, when the MBS transmissions begin with a pre-defined HARQ process id, the pre-defined HARQ process id may be implicitly indicated by the "message type" parameter. In addition, with the RV number and HARQ process id of the first MBS subframe, SS 120 can determine the RV number and HARQ process id of other MBS subframes.

In addition, MBS-MAP may include a parameter identifying a number of HARQ processes (e.g., 0, 1, 2, etc.). In some embodiments, the parameter identifying the number of HARQ processes may be replaced by an equivalent parameter, such as, for example, a "periodicity" or a "distance" to indicate the periodicity of the transmission for the same MBS PDU. In other embodiments, the parameter identifying the number of HARQ processes may be implicitly determined from the "message type" or "pattern mode" parameter. In some embodiments, when HARQ processing is used, the PDCCH may include information to identify an RV as a retransmission of a HARQ process. For example, the PDCCH associated with RV1 of the first MBS PDU may indicate that RV1 is a retransmission of HARQ process id 0. Similarly, the PDCCH associated with RV1 of the third MBS PDU may indicate that RV1 is a retransmission of HARQ process id 2.

In addition, in order to provide retransmission information, the transmitting device may provide certain, additional parameters in a PDCCH or DL-MAP message. For example, the transmitting device may provide resource allocation information for a re-transmission, physical configuration parameters (e.g., MCS) for a re-transmission, information to identify the MBS service corresponding to the retransmission (e.g., mobile radio network temporary identifier (M-RNTI), multicast connection id (MCID), etc.), etc. In some embodiment, it may not be necessary to provide a new data indicator (NDI) parameter or HARQ identifier sequence number (AI_SN) parameter.

In some embodiments, a receiving device (e.g., SS 120) may be configured to perform HARQ process ID mappings.

For example, when the receiving device receives an MBS RV while, at the same time (e.g., in parallel), receiving other unicast services, the receiving device may want to perform HARQ process identifier mapping. That is, when the receiving device is receiving multiple services in parallel, the HARQ process identifier indicated in the MBS-MAP or PDCCH may not be the same as the HARQ process identifier maintained in the receiving device's soft buffer. Therefore, the receiving device may be configured to store and process HARQ process identifier tables and/or mapping information.

Figure 10:
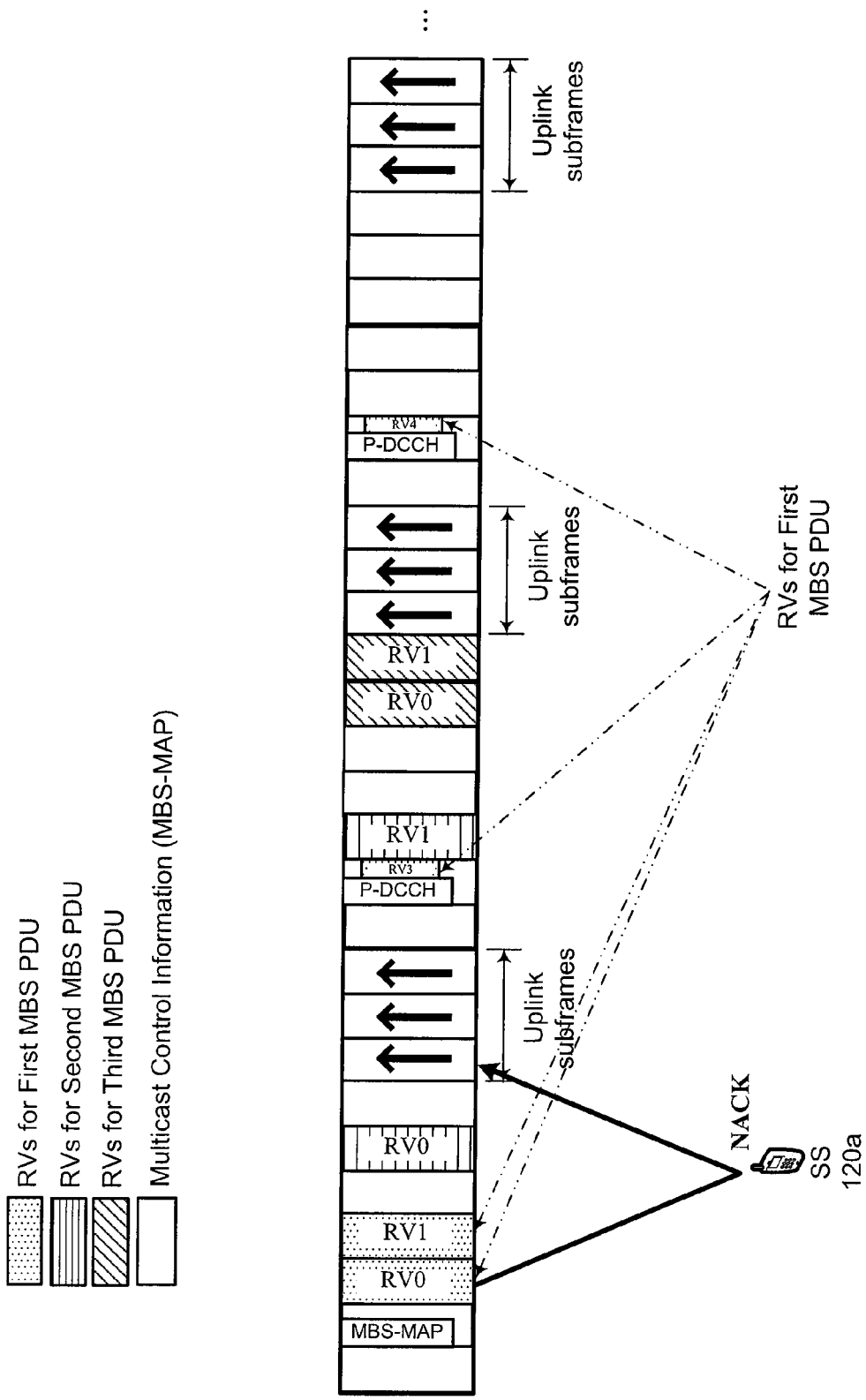
FIG. 10 is a diagram showing MBS transmissions in an exemplary wireless communication system, consistent with certain disclosed embodiments.

FIG. 10 shows an exemplary pattern that may be used by TD 110 to transmit MBS RVs to SSs 120, consistent with certain disclosed embodiments. As shown in FIG. 10, a transmitting device (e.g., TD 110) may retransmit an MBS PDU based on feedback received from a receiving device (e.g., SS 120). To implement this embodiment, a transmitting device (e.g., TD 110) may provide a feedback channel configuration for ACK/NACK feedback in cell-specific control signaling (e.g., SIB, BCCH, SFH, etc.). In addition, the transmitting device may allocate an uplink resource for each HARQ process; allocate an uplink resource for an MBS subframe; and allocate an uplink resource for counting the number of errors. The uplink resources may be an orthogonal code (e.g., RACH signatures, CDMA ranging codes, etc.) or a UL slot. In some embodiments, the transmitting device may transmit this information in an MBS-MAP or MCCH.

As shown by FIG. 10, one or more first MBS RVs may be transmitted by multi-cell transmission mode (e.g., MBSFN), while any subsequent MBS RV transmissions (e.g., retransmissions) may be based on SC-PTM or MC-PTM. In the exemplary embodiment of FIG. 10, retransmission is based on SC-PTM. Thus, as shown in FIG. 10, TD 110 may transmit RV0 and RV1 of a first MBS PDU to SS 120a. TD 110 may transmit the one or more first MBS RVs in any pattern disclosed herein, such as, for example, the patterns disclosed in FIGS. 4a, 4b, 5, 6, 7a, 7b, 8a, 8b, and/or 9. SS 120a may indicate that the transmission was not received or was received with errors by transmitting a NACK in an uplink subframe.

In response to a received NACK, TD 110 may transmit subsequent RVs, e.g., RV3 and RV4, of the first MBS PDU to SS 120a along with control information in the PDCCH. In some embodiments, the multicast control information (e.g., MBS-MAP, MCI, etc.) and PDDCH may use the same identity to represent transmission of the same service. In other embodiments, the multicast control information may use a first identity while PDCCH may use a second identity to represent the transmission of the same service. When the identities are different between the MCI and PDCCH, the BCCH may provide an identity mapping table to provide a mapping between the first and second identities.

The RVs of the first transmission and any re-transmissions may be generated by a same or different MCSs. For example, the MBS RV of a first MBS PDU may be generated by HARQ encoder, interleaver, puncturing processes, but MBS RVs of one or more re-transmissions may be generated by a network coding scheme (e.g., TDD, FDD, etc.).

A number of parameters may be used to identify and decode the MBS RVs transmitted by TD 110 in FIG. 10. Any one or more of these parameters may be provided by cell-specific control signaling (e.g., SIB, BCCH, SFH, etc.) and/or MBSFN control signaling (e.g., MCCH, MBS MAP, Private MAP, etc.). In the embodiment of FIG. 10, the parameters may include, for example, "message type" or "pattern mode," "number of RVs," "number of HARQ processes," "RV number," and/or "HARQ process id," and have been described above in connection with FIG. 9. These parameters may be transmitted directly, or may be determined implicitly from one or more other parameters. In some embodiments, these parameters may be communicated to each SS 120 when it joins the service.

In addition, in order to provide retransmission information, the transmitting device may provide certain, additional parameters in a PDCCH or DL-MAP message. For example, the transmitting device may provide resource allocation information for a re-transmission, physical configuration parameters (e.g., MCS) for a re-transmission, information to identify the MBS service corresponding to the retransmission (e.g., mobile radio network temporary identifier (M-RNTI), multicast connection id (MCID), etc.). In some embodiment, it may not be necessary to provide a new data indicator (NDI) parameter or HARQ identifier sequence number (AI_SN) parameter.

As described above in connection with FIG. 9, in some embodiments, a receiving device (e.g., SS 120) may be configured to perform HARQ process ID mappings. For example, when the receiving device receives an MBS RV while, at the same time (e.g., in parallel), receiving other unicast services, the receiving device may want to perform HARQ process identifier mapping. That is, when the receiving device is receiving multiple services in parallel, the HARQ process identifier indicated in the MBS-MAP or PDCCH may not be the same as the HARQ process identifier maintained in the receiving device's soft buffer. Therefore, the receiving device may be configured to store and process HARQ process identifier tables and/or mapping information.

While the embodiments disclosed herein refer to the 3GPP standards and technologies, the disclosed embodiments may also be used in wireless communications systems utilizing the Institute of Electrical and Electronics Engineers (IEEE) 802.16 family of standards and technologies. For example, the disclosed embodiments may also be used in a wireless communication system using Worldwide Interoperability for Microwave Access (WiMAX), which is promulgated by the WiMax Forum, and is based on the IEEE 802.16 family of standards and technologies. In addition, wireless data may be transmitted using frequency division multiplexing (FDM), time division multiplexing (TDM), code division multiplexing (CDM), and/or media access control (MAC) layer multiplexing.

Moreover, the apparatuses and methods disclosed may be configured to selectively receive data modulated and encoded at a level of robustness that allows for successful decoding of the encoded MBS information bits, while minimizing resource usage. In this manner, the disclosed embodiments may reduce signal processing time and improve data traffic flow associated with error detection and retransmission of data in any type of wireless network. Similarly, the methods and apparatus as described in connection with the disclosed embodiments may be configured to operate in any transmitting and/or receiving device.

It will be apparent to those skilled in the art that various modifications and variations can be made in the system and method for reception in communication networks. It is intended that the standard and examples be considered as exemplary only, with a true scope of the disclosed embodiments being indicated by the following claims and their equivalents.

What is claimed is:

1. A method for multicast and broadcast services (MBS) transmission in a wireless communication system including a plurality of receiving devices, comprising:

encoding, by a transmission device, a plurality of MBS packet data units (PDUs) to generate a plurality of redundant versions of the same data (RVs);

transmitting, to the plurality of receiving devices, the plurality of RVs without waiting for an acknowledgement signal (ACK) or negative acknowledgement signal (NACK) from said receiving devices, wherein the plurality of RVs are transmitted in a predefined transmission pattern; and transmitting, to the plurality of receiving devices, identification and decoding information associated with each of the plurality of RVs sufficient for a receiving device to select the most appropriate RV for decoding.

2. The method as in claim 1, further including:

transmitting, to the plurality of receiving devices, pattern information indicating the predetermined transmission pattern.

3. The method as in claim 2, wherein the pattern information is transmitted to the plurality, of receiving devices contemporaneously with the transmission of the plurality of RVs.

4. The method as in claim 2, wherein the transmitting the pattern information includes transmitting the pattern information to each receiving device of the plurality of receiving devices when the each receiving device joins a service of the transmission device.

5. The method as in claim 2, further including:

receiving, from at least one receiving device of the plurality of receiving devices, a negative acknowledgement (NACK) message; and transmitting, to the at least one receiving device of the plurality of receiving devices, at least one supplemental MBS data version.

6. The method as in claim 5, wherein transmitting the at least one supplemental MBS data version includes transmitting the at least one supplemental MBS data version in a unicast transmission.

7. The method as in claim 1, further including transmitting the plurality of RVs contiguously, and wherein the transmitting the identification and decoding information includes transmitting the identification and decoding information to identify a number of data versions and a starting data version.

8. The method as in claim 1, further including transmitting the plurality of RVs non-contiguously, and wherein the transmitting the identification and decoding information includes transmitting the identification and decoding information to identify a number of data versions and a starting data version.

9. The method as in claim 1, further including transmitting the plurality of RVs on a same channel.

10. The method as in claim 1, further including transmitting the plurality of RVs on different channels.

11. An apparatus for multicast and broadcast services (MBS) transmission in a wireless communication system, the apparatus comprising:

at least one memory to store data and instructions; and at least one processor configured to access the at least one memory and, when executing the instructions, to:

encode a plurality of MBS packet data units (PDUs) to generate a plurality of redundant versions of the same data (RVs);

transmit, to a plurality of receiving devices, the plurality of RVs without waiting for an acknowledgment signal (ACK) or negative acknowledgement signal (NACK) from said receiving devices, wherein the plurality of RVs are transmitted in a predefined transmission pattern; and transmit, to the plurality of receiving devices, identification and decoding information associated with each of the plurality of RVs sufficient for a receiving device to select the most appropriate RV for decoding.

12. The apparatus as in claim 11, wherein the at least one processor is further configured to:

transmit pattern information indicating the predetermined transmission pattern.

13. The apparatus as in claim 12, wherein when the at least one processor is configured to transmit pattern information, the at least one processor is further configured to transmit the pattern information to the plurality of receiving devices contemporaneously with the transmission of the plurality of RVs.

14. The apparatus as in claim 12, wherein when the at least one processor is configured to transmit the pattern information, the at least one processor is further configured to transmit the pattern information to each receiving device of the plurality of receiving devices when the each receiving device joins a service of the transmission device.

15. The apparatus as in claim 11, wherein the at least one processor is further configured to:

receive, from at least one receiving device of the plurality of receiving devices, a negative acknowledgement (NACK) message; and transmitting, to the at least one receiving device of the plurality of receiving devices, at least one supplemental MBS data version.

16. The apparatus as in claim 11, wherein when the at least one processor is configured to transmit the at least one supplemental MBS data version, the at least one processor is further configured to transmit the at least one supplemental MBS data version in a unicast transmission.

17. The apparatus as in claim 11, wherein the at least one processor is further configured to transmit the plurality of RVs contiguously, and when the at least one processor is configured to transmit the identification and decoding information, the at least one processor is further configured to transmit the identification and decoding information to identify a number of data versions and a starting data version.

18. The apparatus as in claim 11, wherein the at least one processor is further configured to transmit the plurality of RVs non-contiguously, and when the at least one processor is configured to transmit the identification and decoding information, the at least one processor is further configured to transmit the identification and decoding information to identify a number of data versions and a starting data version.

19. The apparatus as in claim 11, wherein the at least one processor is further configured to transmit the plurality of RVs on a same channel.

20. The apparatus as in claim 11, wherein the at least one processor is further configured to transmit the plurality of RVs on different channels.

* * * * *